(12) United States Patent
Charlas

(10) Patent No.: US 12,076,949 B2
(45) Date of Patent: Sep. 3, 2024

(54) REPAIR OF ORGANIC MATRIX COMPOSITE PARTS

(71) Applicant: SAFRAN AIRCRAFT ENGINES, Paris (FR)

(72) Inventor: Mathieu Julien Charlas, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 640 days.

(21) Appl. No.: 17/312,672

(22) PCT Filed: Dec. 11, 2019

(86) PCT No.: PCT/FR2019/053014
§ 371 (c)(1),
(2) Date: Jun. 10, 2021

(87) PCT Pub. No.: WO2020/120902
PCT Pub. Date: Jun. 18, 2020

(65) Prior Publication Data
US 2022/0048260 A1    Feb. 17, 2022

(30) Foreign Application Priority Data

Dec. 13, 2018  (FR) ...................... 1872885

(51) Int. Cl.
*B29C 73/02* (2006.01)
*B29C 73/26* (2006.01)
*F01D 5/00* (2006.01)
*F01D 5/28* (2006.01)
*B29L 31/08* (2006.01)

(52) U.S. Cl.
CPC .............. *B29C 73/02* (2013.01); *B29C 73/26* (2013.01); *F01D 5/005* (2013.01); *F01D 5/282* (2013.01); *B29C 2073/264* (2013.01); *B29K 2995/0008* (2013.01); *B29L 2031/082* (2013.01); *F05D 2230/31* (2013.01); *F05D 2230/80* (2013.01); *F05D 2300/507* (2013.01); *F05D 2300/603* (2013.01)

(58) Field of Classification Search
CPC . B29C 73/02; B29K 2995/0008; F01D 5/005; F05D 2230/80; F05D 2300/507
See application file for complete search history.

(56) References Cited

U.S. PATENT DOCUMENTS

| 5,833,795 | A | 11/1998 | Smith et al. |
| 9,156,240 | B2 | 10/2015 | Bertrand et al. |
| 2015/0328847 | A1 | 11/2015 | Kia et al. |
| 2016/0243777 | A1 | 8/2016 | Marchal et al. |

FOREIGN PATENT DOCUMENTS

WO  WO 2010/061140 A1  6/2010

OTHER PUBLICATIONS

International Search Report as issued in International Patent Application No. PCT/FR2019/053014, dated Mar. 19, 2020.

*Primary Examiner* — John J DeRusso
(74) *Attorney, Agent, or Firm* — Pillsbury Winthrop Shaw Pittman LLP

(57) ABSTRACT

A process for repairing a part made of organic matrix composite material coated with at least one layer of paint includes removing the paint at a damaged area of the part, removing the composite material at the damaged area so as to form a recessed portion, depositing a repair resin in the recessed portion, curing the repair resin, applying at least one layer of paint to the repair area. The repair resin is loaded with magnetically detectable particles.

5 Claims, 4 Drawing Sheets

[Fig. 1]
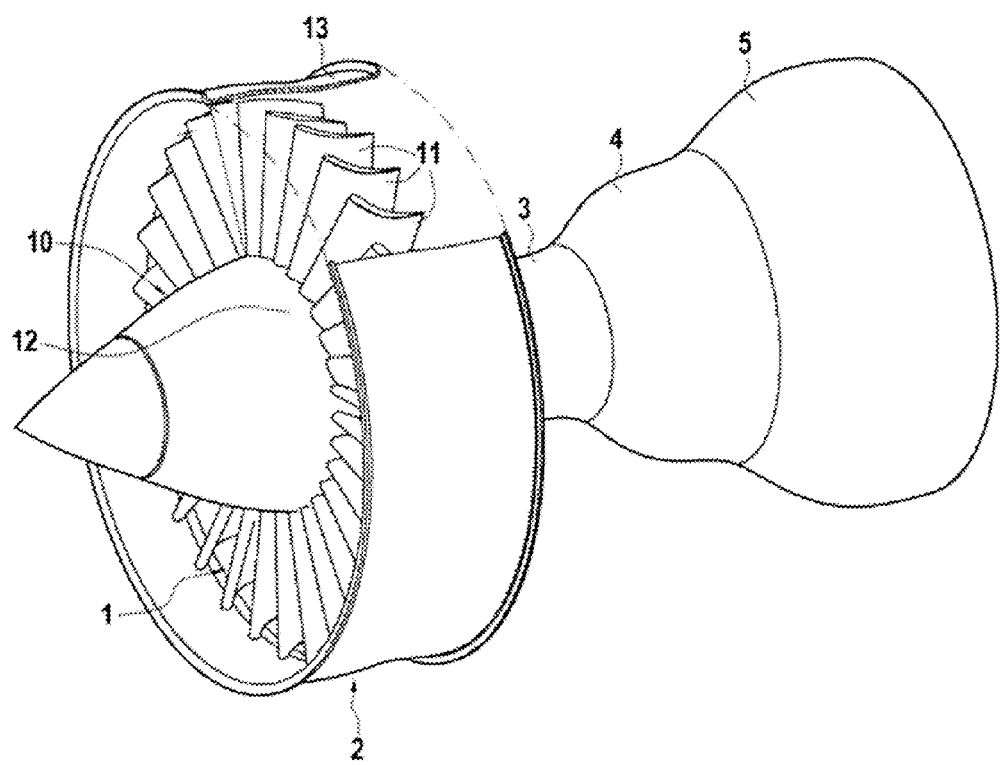

[Fig. 2]
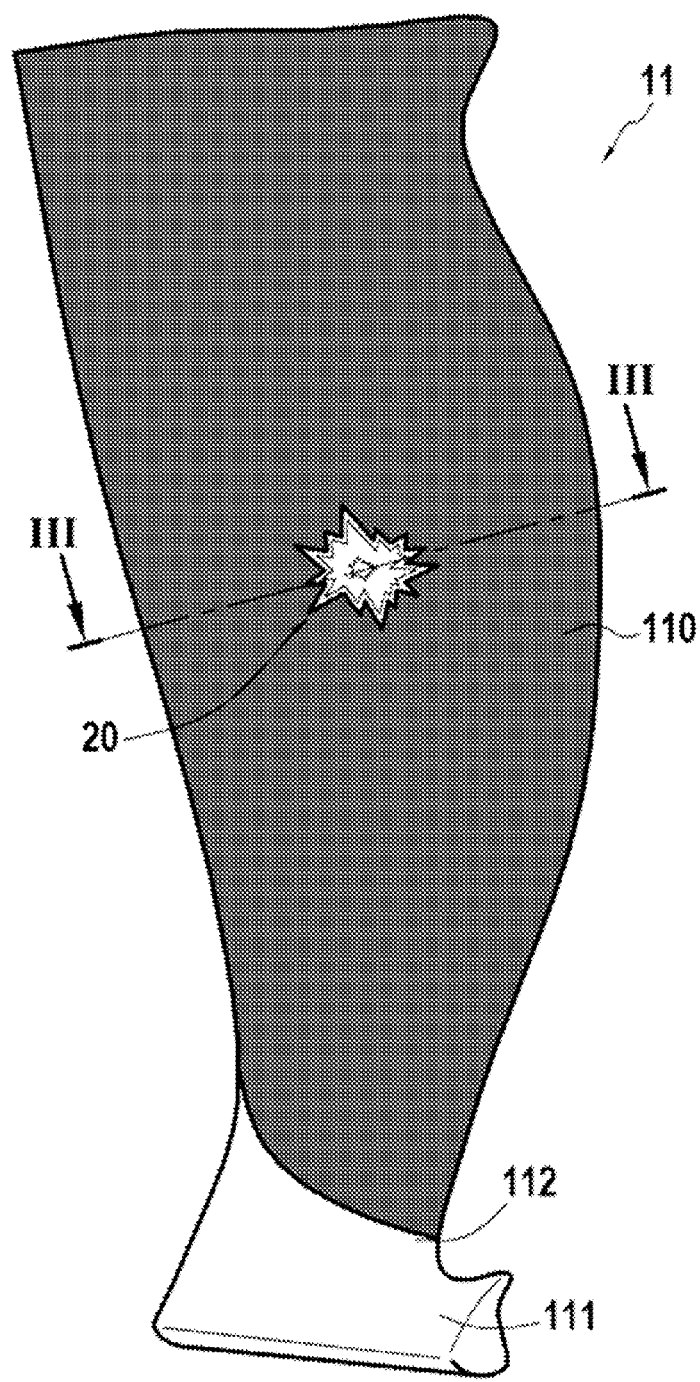

[Fig. 3]
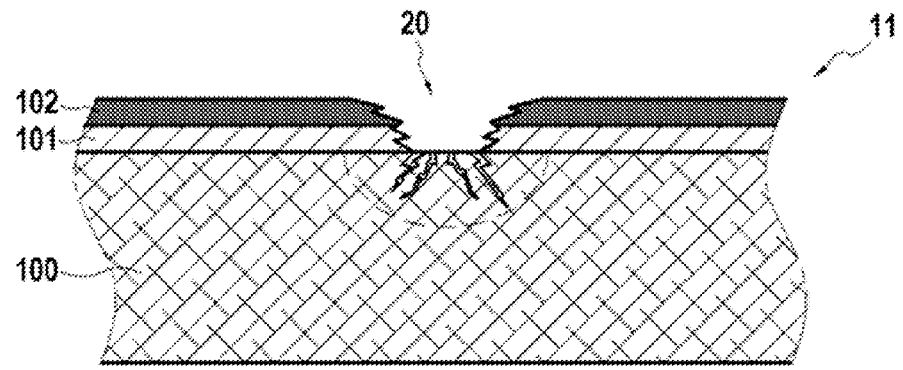
[Fig. 4]
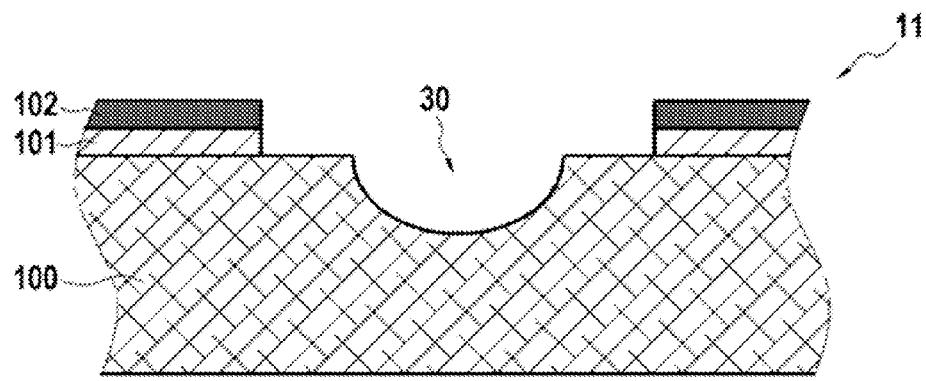
[Fig. 5]
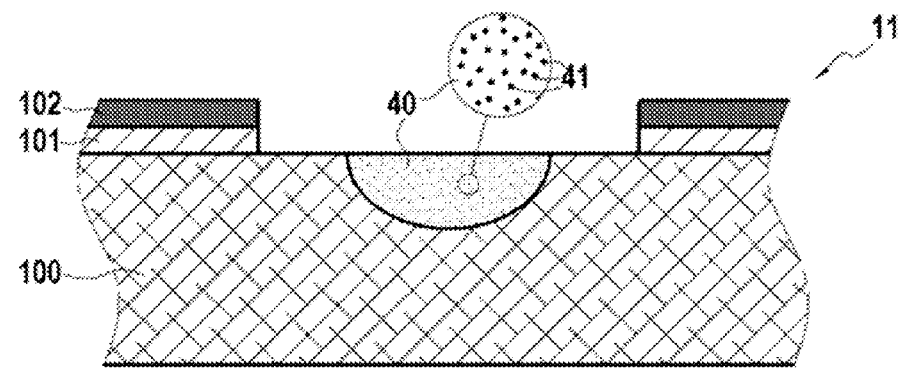

[Fig. 6]
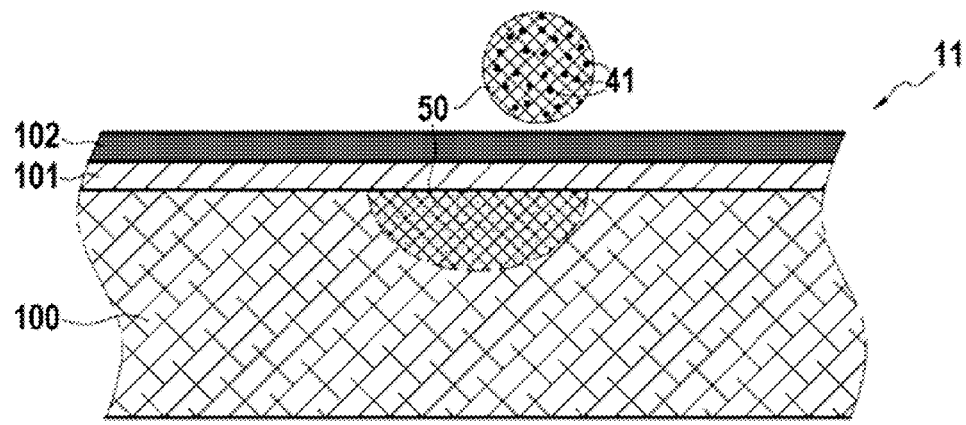

REPAIR OF ORGANIC MATRIX COMPOSITE PARTS

CROSS-REFERENCE TO RELATED APPLICATIONS

This application is the U.S. National Stage of PCT/FR2019/053014, filed Dec. 11, 2019, which in turn claims priority to French patent application number 1872885 filed Dec. 13, 2018. The content of these applications are incorporated herein by reference in their entireties.

TECHNICAL FIELD

The invention relates to the repair of parts made of organic matrix composite (OMC) material, i.e., comprising a fibrous reinforcement densified by a matrix of an organic nature.

PRIOR ART

A common process for obtaining composite parts is the liquid process. The liquid process consists in making a fibrous preform having substantially the shape of a part to be made and intended to constitute the reinforcement of the composite material, and in impregnating this preform with a liquid composition containing a precursor of the matrix material. The precursor is typically in the form of a polymer, such as a thermoplastic or thermosetting resin, possibly diluted in a solvent. The conversion of precursor to matrix is carried out by heat treatment, after removal of the possible solvent and crosslinking of the polymer. The manufacture of an organic matrix composite blade for a gas turbine aircraft engine is described in particular in document US 2016/243777.

OMC parts can be damaged by shock or impact. This is the case, for example, of aircraft engine fan blades or cases subjected to impacts with foreign objects such as birds or debris. It is imperative to repair the damaged area in order to restore the structural integrity and avoid any propagation of defects from the damaged area before the part can be put back into service.

Most OMC parts have a layer of paint on their surface that covers the organic matrix material. Therefore, the repair of a painted OMC part includes, in addition to replacing the damaged area of the OMC, repainting the entire area. Consequently, once the repair is completed, the repaired area is no longer visible. However, it is desirable to be able to locate a repair in an OMC part, for example for reasons of mechanical integrity, as it is important to maintain a minimum safety distance between two repairs.

DISCLOSURE OF THE INVENTION

The aim of the invention is to propose a solution for the repair of organic matrix composite parts that allows the location of the repaired portion or area even if it is not visually detectable.

This aim is achieved by virtue of a process for repairing a part made of organic matrix composite material coated with at least one layer of paint comprising:
a) removing the paint at a damaged area of the part,
b) removing the composite material at the damaged area so as to form a recessed portion,
c) depositing a repair resin in the recessed portion,
d) curing the repair resin,
e) applying at least one layer of paint to the repair area, wherein the repair resin is loaded with magnetically detectable particles.

By loading the repair resin with magnetically detectable particles, it is possible to identify and locate a previously repaired area or areas on a composite part by simple magnetic detection. The presence of a paint layer on the surface of the composite material is no longer an obstacle to the detection of repair areas.

According to a first feature of the repair process of the invention, it further comprises, prior to steps a) to e), a step of checking for the absence of a repair resin at a determined distance from the damaged area. Thus, if one or more repairs with a repair resin loaded with magnetically detectable particles have already been carried out at a distance too close to the damaged area, this can be detected. In such a case, the new repair is not carried out because it is impossible and the part is discarded.

According to a second feature of the repair process of the invention, the magnetically detectable particles are ferromagnetic material particles. The presence of one or more repaired areas in the part can be detected by detecting the magnetic field emitted by the ferromagnetic particles present in the repair resin. In this case, the repair resin preferably contains between 10% and 50% by weight of ferromagnetic material particles.

According to a third feature of the repair process of the invention, the magnetically detectable particles are paramagnetic or superparamagnetic material particles. The presence of one or more repaired areas in the part can be detected by the magnetic response of the paramagnetic or superparamagnetic particles present in the repair resin. In this case, the repair resin preferably contains between 1% and 10% by weight of paramagnetic or superparamagnetic material particles.

The invention also relates to a part made of organic matrix composite material coated with at least one layer of paint, the part having at least one repair portion present in the organic matrix composite material, said portion comprising a crosslinked repair resin, wherein the repair resin is loaded with magnetically detectable particles.

According to a first feature of the part of the invention, the particles capable of being magnetically detected are ferromagnetic material particles. The presence of one or more repaired areas in the part can be detected by detecting the magnetic field emitted by the ferromagnetic particles present in the repair resin. In this case, the repair resin preferably contains between 10% and 50% by weight of ferromagnetic material particles.

According to a second feature of the part of the invention, the magnetically detectable particles are paramagnetic or superparamagnetic material particles. The presence of one or more repaired areas in the part can be detected by the magnetic response of paramagnetic or superparamagnetic particles present in the repair resin. In this case, the repair resin preferably contains between 1% and 10% by weight of paramagnetic or superparamagnetic material particles.

BRIEF DESCRIPTION OF THE DRAWINGS

Other features and advantages of the invention will emerge from the following description of particular embodiments of the invention, given by way of non-limiting examples, with reference to the appended drawings, wherein:

FIG. 1 is a perspective view of an aircraft engine comprising a fan,

FIG. 2 is a schematic perspective view of a fan blade of the engine of FIG. 1 with a damaged area, FIG. 3 is a partial cross-sectional view of the blade of FIG. 2 along sectional plane III, FIG. 4 shows the blade section of FIG. 3 after preparation of the damaged area, FIG. 5 shows the blade portion of FIG. 4 after deposition of a repair resin, FIG. 6 shows the blade section of FIG. 5 after the repair resin has cured and the primer and paint layers have been repainted.

DESCRIPTION OF THE EMBODIMENTS

The invention applies generally to any part made of an organic matrix composite material, i.e., comprising a fibrous reinforcement made, for example, of carbon, glass or ceramic fibers and densified by a matrix typically corresponding to a polymer resin, such as a thermoplastic or thermosetting resin, possibly diluted in a solvent, the part being furthermore coated with at least one layer of paint.

The invention will be described below in the context of its application to the repair of a gas turbine aircraft engine fan blade.

Such an engine, as shown very schematically in FIG. 1, comprises, from upstream to downstream in the direction of the gas flow, a fan 1 arranged at the engine inlet, a compressor 2, a combustion chamber 3, a high-pressure turbine 4 and a low-pressure turbine 5.

The fan 1 comprises a spinner 10 consisting of a plurality of blades 11 each mounted on a turbine rotor 12 and surrounded by a fan casing 13 having a form of revolution.

FIG. 2 shows a fan blade 11 which is here made of organic matrix composite material, i.e., from a fibrous reinforcement of for example carbon, glass, aramid or ceramic fibers, densified by a polymer matrix, for example epoxide, bismaleimide or polyimide. The fibrous reinforcement is made from a fibrous texture obtained by three-dimensional weaving in a single piece, the texture being shaped in a tool. The fibrous reinforcement thus formed is then densified by a matrix, for example according to the well-known "RTM" injection molding process. The manufacture of such a blade is described in particular in document US 2016/243777.

In general, the fibrous reinforcement of the composite part of the invention can be made from a fibrous texture of fibers of various natures, in particular carbon, glass or ceramic (for example silicon carbide) or carbon fibers. The fibrous texture used can be of various natures and forms such as in particular:
two-dimensional (2D) fabric,
three-dimensional (3D) fabric obtained by 3D or multilayer weaving as described in particular in document WO 2010/061140 and whose content is incorporated herein by reference,
braid,
knitted fabric,
felt,
unidirectional (UD) web of yarns or cables or multidirectional (nD) web obtained by superimposing several UD webs in different directions and bonding the UD webs together, for example by sewing, by chemical bonding agent or by needling.

The composite material of the blade is coated with a layer of paint 102 visually masking the composite material.

The fan blade 11 comprises a longitudinally extending blade body 110 and a root 111 formed by a thicker part, for example with a bulbous cross-section, which is connected by a hub 112 to the blade body 110. The blade 11 is mounted on the turbine rotor 12 by engagement of the root 111 in a correspondingly shaped casing arranged at the periphery of the rotor.

In FIGS. 2 and 3, the blade 11 has a damaged area 20 resulting from, for example, an impact with an object ingested by the engine fan, such as a bird, debris, ice, etc.

In FIG. 3 and in the example described here, the blade 11 comprises an organic matrix composite material 100 defining the general shape of the blade and in particular its volume. The composite material is coated with a layer of paint 102. Still in the example described here, a layer of a primer 101, for example an adhesion primer of the silane/ethanol type, is first deposited on the surface of the composite material 100 in order to promote the adhesion of the paint layer 102. However, when the composite material of the part has a surface finish compatible with the adhesion of a paint, the prior deposit of a primer is not necessary and the paint can be directly deposited on the exposed surface of the composite material.

Still in FIG. 3, it can be seen that the damaged area 20 extends into the layers of paint 102 and primer 101 and into the composite material 100.

Before starting the actual repair of the damaged area, the process may include checking for the absence of a repair resin at a certain distance from the damaged area. If a repair is already present in the part at a distance too close to the damaged area, for example at a distance of less than 2 mm, a new repair is not possible. Thus, if one or more repairs with a repair resin loaded with magnetically detectable particles have already been made at a distance too close to the damaged area, this can be detected. In such a case, the new repair is not carried out because it is not possible and the part is discarded.

The repair of the blade 11 begins by machining the casing at the damaged area 20 to remove the affected composite material. More precisely, the paint 102 and the primer 101 at the damaged area 20 are first removed, such as by sanding, to expose the organic matrix composite material 100 in that area. The composite material 100 is then machined, such as by abrasion, to remove the portion of the composite material 100 that has been damaged. The removal of the composite material is performed over a specified area and depth of the blade, at least the area identified as damaged.

As shown in FIG. 4, a recessed portion 30 which opens onto the outer surface of the blade 11 is obtained.

After possibly degreasing the exposed area with, for example, isopropyl alcohol, a repair resin 40 is deposited in the recessed portion. The repair resin may include, for example, an epoxy resin, a polyurethane resin, a BMI resin, a phthalonitrile resin and a phenolic resin.

In accordance with the invention, the repair resin 40 is loaded with magnetically detectable particles 41 as shown in FIG. 5.

According to a first aspect of the invention, the particles suitable for magnetic detection are ferromagnetic material particles. The ferromagnetic material used to make the particles may be, in particular, ferrite, cobalt samarium, neodymium-iron-boron or nickel. Ferromagnetic materials have the property of becoming magnetic, i.e., magnetizing, when placed in a magnetic field and of retaining some of this magnetism when the field is removed. The magnetic field emitted by ferromagnetic particles can be detected with a magnetometer. In order to be easily detected, it is preferable to have a substantial amount of ferromagnetic particles in the repair resin. The repair resin contains between 10% and 50% by weight of ferromagnetic material particles, preferentially 30%. The size of the ferromagnetic particles ranges from nanometers to millimeters.

According to a second aspect of the invention, the particles suitable for magnetic detection are paramagnetic or superparamagnetic material particles. Unlike ferromagnetic materials, paramagnetic or superparamagnetic materials do not naturally emit a magnetic field. These materials acquire magnetization in the same direction as the magnetic field in which they are immersed, but lose this magnetization when they are removed from the magnetic field. In other words, particles made of paramagnetic or superparamagnetic material only have a magnetic response when excited by another magnetic field. The paramagnetic or superparamagnetic material used to make the particles can be nano-ferrite or single-crystal nickel. In the case of single-crystal nickel, it is hyperquenched nickel, hyperquenching being a rapid cooling that does not allow the formation of martensite. After hyperquenching, an austenitic steel (matestible austenite) with a rather low yield strength, of the order of 200 MPa, is obtained The presence of paramagnetic or superparamagnetic particles can be detected with a probe consisting of an inductance (coil) excited by an alternating voltage having a frequency fu and in which the frequency fi of the current flowing in the inductance is measured. Any difference in value between fu and fi indicates the presence of a disturbance due to the presence of a magnetic response of the particle material.

Paramagnetic or superparamagnetic particles have the advantage of being detectable at relatively low concentration levels. In the case of paramagnetic or superparamagnetic material particles, the repair resin contains between 1% and 10% by weight of ferromagnetic material particles, preferentially 3%. The size of the paramagnetic or superparamagnetic particles varies from nanometers to millimeters. Therefore, the use of paramagnetic or superparamagnetic particles reduces the amount of particles present in the repair resin compared with ferromagnetic particles and keeps the mechanical properties of the resin almost unchanged.

Once deposited in the recess 30, the repair resin 40 loaded with the magnetically detectable particles 41 is subjected to a crosslinking treatment, such as a heat treatment, to obtain a repair portion 50 still comprising the magnetically detectable particles 41 as illustrated in FIG. 6. A primer layer and a paint layer are deposited on the exposed area to reconstitute the primer layer 101 and the paint layer 102 present on the composite coating 100 of the blade 11.

Thus, the invention allows detection of any portion of a repair in a composite part, and does so in a manner that is non-destructive to the coating layer(s) present on the surface of the repaired composite material. Non-limitingly, the invention is advantageously applicable to a casing, an acoustic panel, outlet guide vanes (OGVs) and a gas turbine engine nacelle.

The invention claimed is:

1. A process for repairing a part made of organic matrix composite material coated with at least one layer of paint comprising the following steps:
   a) removing the at least one layer of paint at a damaged area of the part,
   b) removing the organic matrix composite material at the damaged area so as to form a recessed portion,
   c) depositing a repair resin in the recessed portion,
   d) curing the repair resin,
   e) applying at least one layer of paint to the repair area, wherein the repair resin is loaded with magnetically detectable particles, and
   wherein the process further comprises, prior to steps a) through e), a step of checking for an absence of a repair resin at a determined distance from the damaged area.

2. The process as claimed in claim 1, wherein the magnetically detectable particles are ferromagnetic material particles.

3. The process as claimed in claim 2, wherein the repair resin contains between 10% and 50% by weight of ferromagnetic material particles.

4. The process as claimed in claim 1, wherein the magnetically detectable particles are paramagnetic or superparamagnetic material particles.

5. The process as claimed in claim 4, wherein the repair resin contains between 1% and 10% by weight of paramagnetic or superparamagnetic material particles.

* * * * *